(12) United States Patent  (10) Patent No.: US 12,354,391 B2
Srinivasa et al.  (45) Date of Patent: Jul. 8, 2025

(54) METHODS AND APPARATUS FOR TEXT IDENTIFICATION AND EXTRACTION WITHIN IMAGES USING MACHINE LEARNING PROCESSES

(71) Applicant: Walmart Apollo, LLC, Bentonville, AR (US)

(72) Inventors: Ramanujam Ramaswamy Srinivasa, Bengaluru (IN); Pranav Aggarwal, Navi Mumbai (IN)

(73) Assignee: Walmart Apollo, LLC, Bentonville, AR (US)

( * ) Notice: Subject to any disclaimer, the term of this patent is extended or adjusted under 35 U.S.C. 154(b) by 209 days.

(21) Appl. No.: 17/826,837

(22) Filed: May 27, 2022

(65) Prior Publication Data

US 2023/0401877 A1 Dec. 14, 2023

(51) Int. Cl.
*G06V 30/14* (2022.01)
*G06V 10/82* (2022.01)
*G06V 30/18* (2022.01)
*G06V 30/19* (2022.01)
*G06V 30/412* (2022.01)
*G06V 30/416* (2022.01)
*G06V 30/42* (2022.01)

(52) U.S. Cl.
CPC .......... *G06V 30/1448* (2022.01); *G06V 10/82* (2022.01); *G06V 30/18105* (2022.01); *G06V 30/19147* (2022.01); *G06V 30/42* (2022.01); *G06V 30/412* (2022.01); *G06V 30/416* (2022.01)

(58) Field of Classification Search
CPC ......... G06V 30/1448; G06V 30/18105; G06V 30/19147; G06V 30/42; G06V 30/416; G06V 10/82; G06V 30/412
See application file for complete search history.

(56) References Cited

U.S. PATENT DOCUMENTS

| | | | | |
|---|---|---|---|---|
| 5,579,407 | A | * 11/1996 | Murez | G06V 30/1444 382/175 |
| 6,301,360 | B1 | * 10/2001 | Bocionek | H04N 1/32203 380/54 |
| 9,239,952 | B2 | 1/2016 | Hsu et al. | |
| 10,572,725 | B1 | * 2/2020 | Becker | G06F 18/2413 |
| 2001/0053248 | A1 | * 12/2001 | Maeda | H04N 1/4074 382/165 |
| 2010/0202698 | A1 | * 8/2010 | Schmidtler | G06V 30/416 382/317 |

(Continued)

*Primary Examiner* — Amandeep Saini
*Assistant Examiner* — Daniella M. DiGuglielmo
(74) *Attorney, Agent, or Firm* — Morgan, Lewis & Bockius LLP; Manita Rawat

(57) ABSTRACT

This application relates to systems and methods for identifying anomalous interactions. Interaction data representative of an interaction is received and the interaction is classified as one of an anomalous interaction or a benign interaction using an anomaly detection model. The anomaly detection model is configured to identify a similarity between the interaction data and known benign interactions. An indication of authorization is generated based on the classification of the interaction. The indication of authorization authorizes the interaction when the anomaly detection model classifies the interaction as benign and the indication of authorization denies the interaction when the anomaly detection model classifies the interaction as anomalous.

19 Claims, 10 Drawing Sheets

(56) References Cited

U.S. PATENT DOCUMENTS

| | | | |
|---|---|---|---|
| 2015/0078671 A1* | 3/2015 | Van Deventer | G06V 30/412 |
| | | | 382/217 |
| 2015/0169951 A1* | 6/2015 | Khintsitskiy | G06V 30/418 |
| | | | 382/182 |
| 2020/0151443 A1* | 5/2020 | Florencio | G06V 30/412 |
| 2020/0302208 A1* | 9/2020 | Hoehne | G06N 3/08 |
| 2023/0114402 A1* | 4/2023 | Shin | G06T 7/90 |
| | | | 382/157 |

* cited by examiner

| CUSTOMER ORDER INFORMATION | | | | ADDITIONAL SHIPPER INFO |
|---|---|---|---|---|
| CUSTOMER ORDER NUMBER | # PKGS | Weight | PALLET/SLIP | Supplier Number: 243022140 |
| 1822500398 | 45 | 386 | N | |
| 2072540296 | 36 | 317 | N | |
| 1922500395 | 32 | 322 | N | |
| 1616639909 | 7 | 96 | N | |

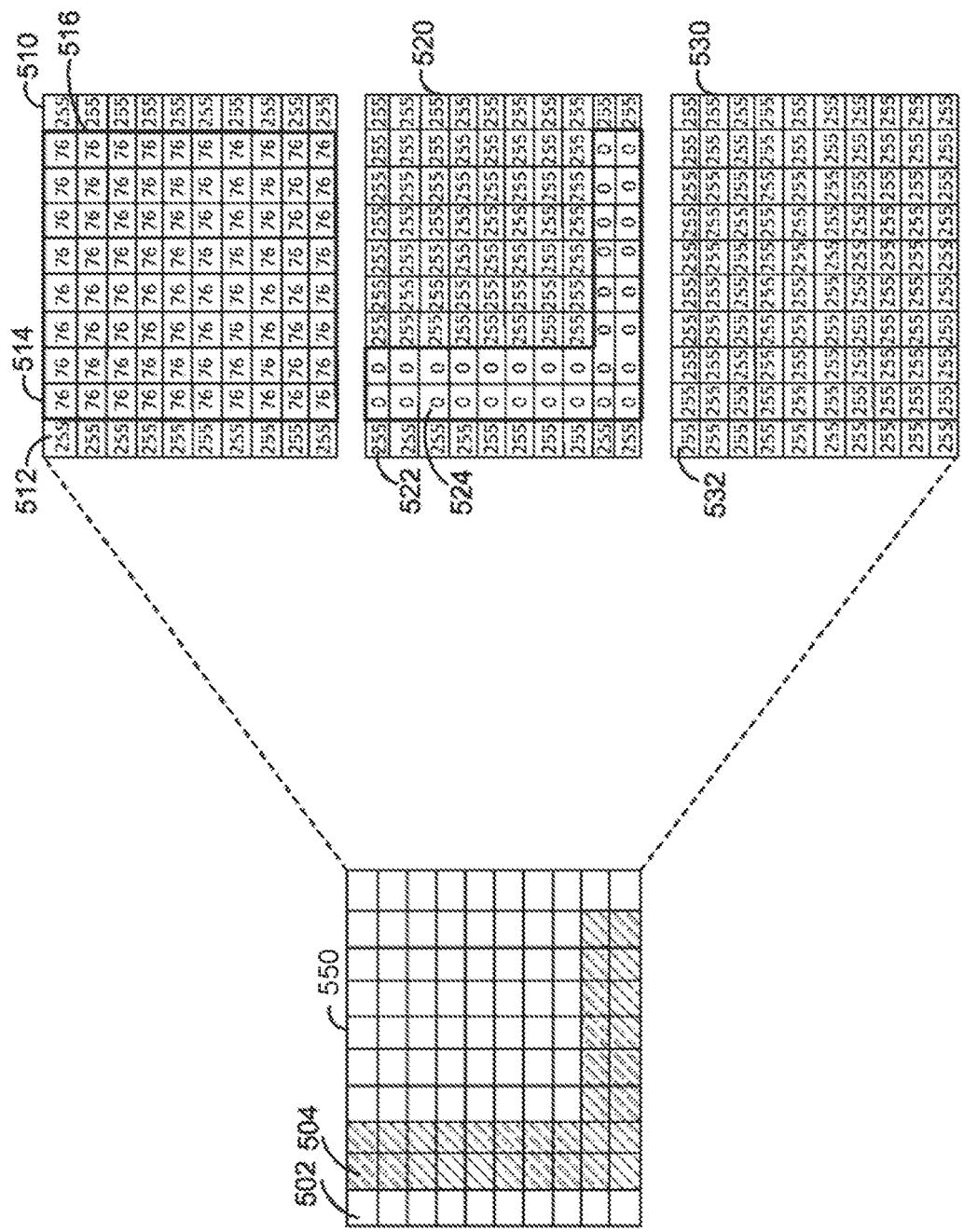

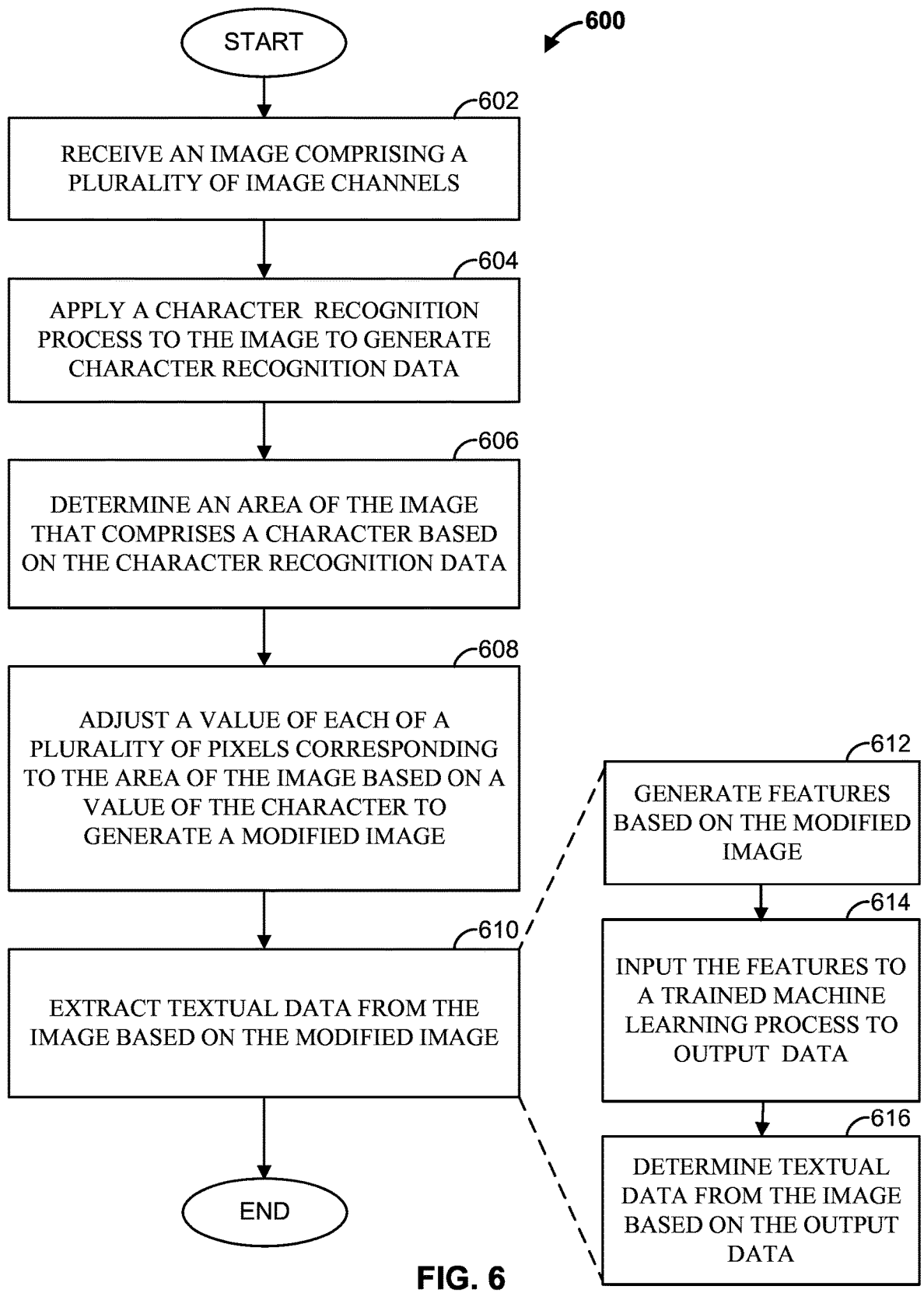

METHODS AND APPARATUS FOR TEXT IDENTIFICATION AND EXTRACTION WITHIN IMAGES USING MACHINE LEARNING PROCESSES

TECHNICAL FIELD

The disclosure relates generally to text extraction processes and, more specifically, to automatically identifying and extracting text within images using machine learning processes.

BACKGROUND

Businesses, such as manufacturers, shippers, and retailers, often maintain documentation describing products. For instance, a manufacturer may maintain a document that describes an inventory of products the manufacturer produces. Similarly, a retailer may maintain a document that describes the products available for sale. A shipping company may maintain a document describing products that are shipped, such as those picked up at a manufacturer and delivered to a retailer. For instance, a retailer may issue a purchase order to a manufacture for the purchase of products. Further, a shipping company may generate a bill of lading (BOL) that identifies the purchased products, and for which the shipping company is to pick up from the manufacturer and deliver to the retailer.

These various documents, while listing similar information, such as a purchase order number, may be found on different locations of the document and may be formatted differently. For example, while a purchase order may list a purchase order number on one location of the purchase order (e.g., top left of the document), the BOL may list the purchase order number on another location of the BOL (e.g., center of the BOL). In addition, each document may format the purchase order number differently. Businesses may locate and compare the numbers to assure that the products to be delivered (e.g., as indicated in the BOL) are the products that were ordered (e.g., as indicated on the purchase order). Often times, this process is performed manually. For instance, a representative of a business may locate a particular number on the BOL, and compare it to a number on the purchase order to assure the numbers match. As such, businesses may benefit from automatic processes that identify and extract corresponding text from various documents.

SUMMARY

Documents of different types may include information in different locations, and may have differing layouts. For instance, a document's layout may include a title, boxed contents, paragraphs, and tables, among other examples. Extracting similar information from documents of varying layouts presents challenges as the information may be present in different areas of the documents, and using varying formats. For instance, one document may present data, such as product identification numbers (e.g., product IDs), in a tabular format, while another document may present the same data in a paragraph format. Further, the documents may present the data in different locations of the respective document.

The embodiments presented herein may use trained machine learning processes to automatically identify and extract corresponding information (e.g., purchase order numbers, product identification numbers, product quantity values, purchase price values, etc.) from documents of varying layouts. In some examples, the embodiments may compare the extracted information to determine whether the information extracted from the various documents is, or is not, the same. The embodiments may allow businesses to automate the process of verifying information across various documents, thereby saving the businesses time and costs. The embodiments may also reduce errors associated with verifying information, among other advantages. Persons of ordinary skill in the art having the benefit of these disclosures would recognize these and other benefits as well.

In accordance with various embodiments, exemplary systems may be implemented in any suitable hardware or hardware and software combination, such as in one or more suitable computing devices that execute instructions. For example, in some embodiments, a computing device (e.g., server) comprising at least one processor is configured to receive an image comprising at least one image channel (e.g., red, green, and blue image channels; luminance and chrominance channels, a grayscale channel, etc.). The computing device is also configured to determine optical character recognition (OCR) data for the image. Further, the computing device is configured to determine an area of the image that comprises a character based on the OCR data. The computing device is also configured to adjust a value of each of a plurality of pixels corresponding to the area of the image based on a value of the character to generate a modified image. The computing device is further configured to generate textual data based on the modified image.

In some embodiments, a method by at least one processor includes receiving an image comprising at least one image channel. The method also comprises determining optical character recognition (OCR) data for the image. Further, the method comprises determining an area of the image that comprises a character based on the OCR data. The method also comprises adjusting a value of each of a plurality of pixels corresponding to the area of the image based on a value of the character to generate a modified image. The method further comprises generating textual data based on the modified image.

In some embodiments, a non-transitory computer readable medium has instructions stored thereon. The instructions, when executed by at least one processor, cause a device to perform operations that comprise receiving an image comprising at least one image channel. The operations also comprise determining optical character recognition (OCR) data for the image. Further, the operations comprise determining an area of the image that comprises a character based on the OCR data. The operations also comprise adjusting a value of each of a plurality of pixels corresponding to the area of the image based on a value of the character to generate a modified image. The operations further comprise generating textual data based on the modified image.

In some embodiments, a computing device (e.g., server) comprising at least one processor is configured to receive a plurality of modified images, wherein each modified image comprises a plurality of pixel values adjusted based on a value of a character of a corresponding image. The computing device is also configured to receive ground truth data corresponding to each of the plurality of modified images. Further, the computing device is configured to generate features based on the plurality of modified images and the corresponding ground truth data. The computing device is also configured to train a machine learning process based on the features.

In some embodiments, a method by at least one processor includes receiving a plurality of modified images, wherein each modified image comprises a plurality of pixel values adjusted based on a value of a character of a corresponding image. The method also comprises receiving ground truth data corresponding to each of the plurality of modified images. Further, the method comprises generating features based on the plurality of modified images and the corresponding ground truth data. The method also comprises training a machine learning process based on the features.

In some embodiments, a non-transitory computer readable medium has instructions stored thereon. The instructions, when executed by at least one processor, cause a device to perform operations that comprise receiving a plurality of modified images, wherein each modified image comprises a plurality of pixel values adjusted based on a value of a character of a corresponding image. The operations also comprise receiving ground truth data corresponding to each of the plurality of modified images. Further, the operations comprise generating features based on the plurality of modified images and the corresponding ground truth data. The operations also comprise training a machine learning process based on the features.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 5B illustrates a plurality of image channels of a modified image in accordance with some embodiments;

FIG. 6 is a flowchart of an example method that can be carried out by the data extraction system 100 of FIG. 1 in accordance with some embodiments.

DETAILED DESCRIPTION

Figure 1:
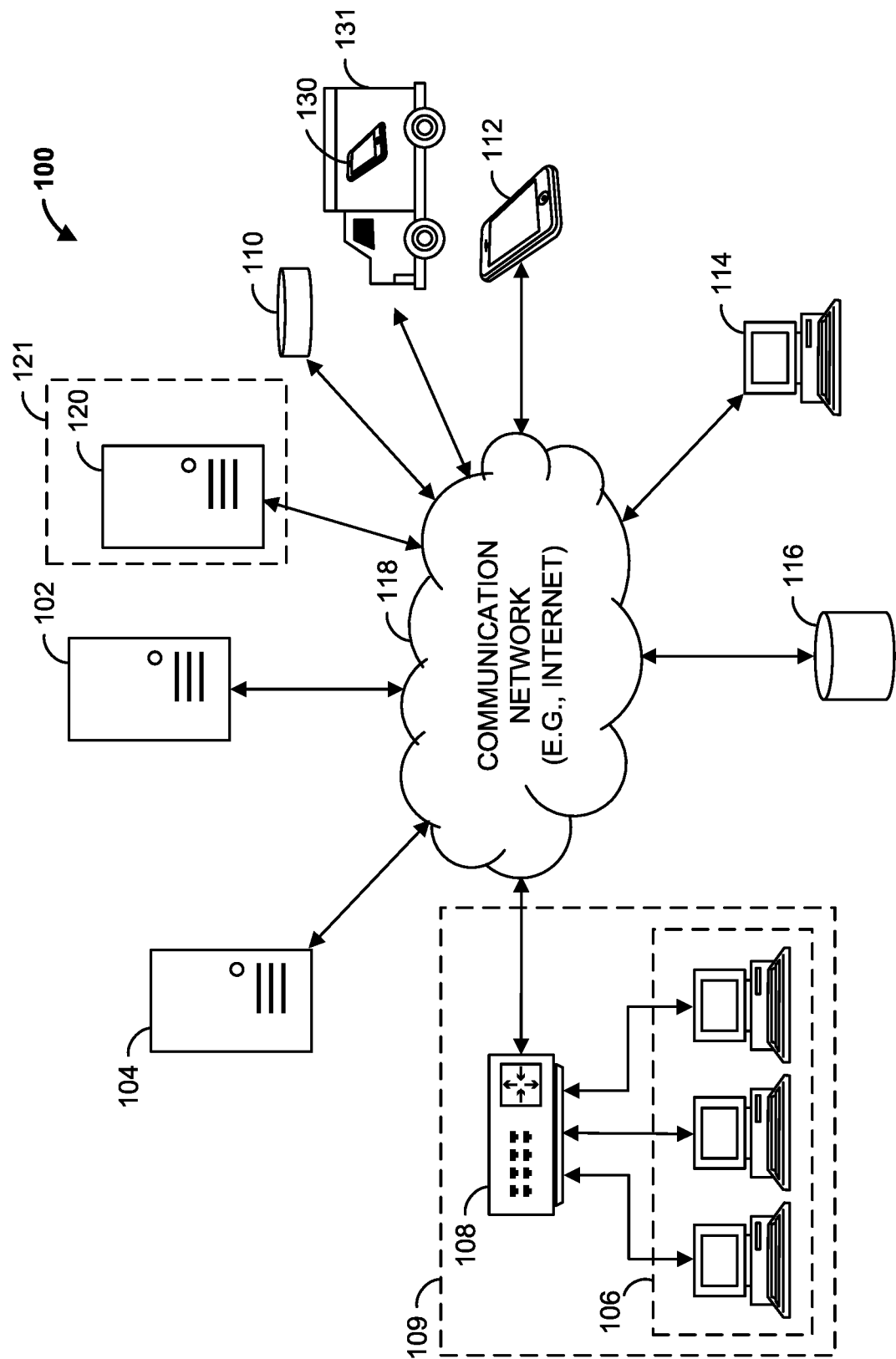
FIG. 1 is a block diagram of an data extraction system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments employ machine learning processes to determine, identify, and extract text from document images. For example, the embodiments may apply a character recognition process to a document image to determine textual content, and may embed the textual content into an image channel of the image to generate a modified image. The image channel may be, for example, one of the image channels corresponding to the document image (e.g., red, green, blue channel), or a newly created image channel (e.g., a fourth image channel). A trained machine learning process may be applied to the modified image to identify content within the corresponding document. For instance, a trained machine learning model may input features generated from elements of the modified image, and may output data characterizing bounding boxes identifying locations within the modified image that include particular content. Further, portions of the determined textual content may be identified and extracted based on the bounding boxes.

Turning to the drawings, FIG. 1 illustrates a block diagram of a data extraction system 100 that includes data extraction computing device 102 (e.g., a server, such as an application server), web server 104, workstation(s) 106, database 116, supplier server 120, shipper computing device 130, and multiple customer computing devices 110, 112, 114 operatively coupled over network 118. Data extraction computing device 102, workstation(s) 106, supplier server 120, shipper computing device 130, and multiple customer computing devices 110, 112, 114 can each be any suitable computing device that includes any hardware or hardware and software combination for processing data. For example, each of data extraction computing device 102, web server 104, workstations 106, supplier server 120, shipper computing device 130, and multiple customer computing devices 110, 112, 114 can include one or more processors (e.g., each processor including one or more processing cores), one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of data extraction computing device 102 and supplier server 120 can be a computer, a workstation, a laptop, a server such as a cloud-based server, a distributed computing system, or one or more of any other suitable device. Each of shipper computing device 130 and multiple customer computing devices 110, 112, 114 can be a mobile device such as a cellular phone, a laptop, a computer, a table, a personal assistant device, a voice assistant device, a digital assistant, or any other suitable device.

Although FIG. 1 illustrates three customer computing devices 110, 112, 114, data extraction system 100 can include any number of customer computing devices 110, 112, 114. Similarly, data extraction system 100 can include any number of workstation(s) 106, data extraction computing devices 102, supplier servers 120, web servers 104, shipper computing devices 130, and databases 116.

Workstation(s) 106 are operably coupled to communication network 118 via router (or switch) 108. Workstation(s) 106 and/or router 108 may be located at a store 109, for example. In some examples, workstation 106 executes one or more applications to manage inventory at store 109. Workstation(s) 106 can communicate with data extraction computing device 102 over communication network 118. The workstation(s) 106 may send data to, and receive data from, data extraction computing device 102. For example, the workstation(s) 106 may transmit data related to a transaction, such as a purchase transaction, to data extraction computing device 102. Workstation(s) 106 may also communicate with web server 104. For example, web server 104 may host one or more web pages, such as a retailer's website. Workstation(s) 106 may be operable to access and program (e.g., configure) the webpages hosted by web server 104 through, for example, an Application Programming Interface (API).

Database 116 can be a remote storage device, such as a cloud-based server, a memory device on another application server, a networked computer, or any other suitable remote storage. Data extraction computing device 102 is operable to communicate with database 116 over communication network 118. For example, data extraction computing device 102 can store data to, and read data from, database 116. For instance, data extraction computing device 102 may store catalog information for a plurality of items, such as items sold at store 109 or on a website hosted by web server 104, within database 116. The catalog information can include, for each of the items, one or more of an item name, and item brand, an item price, an item description, an item category, or any other item attribute or information. Database 116 may further store images of documents (e.g., digital documents), such as images of purchase orders and BOLs. Although shown remote to data extraction computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items.

Supplier server 120 may be operated by a supplier 121, such as a manufacturer, a third-party seller, a supplier, or a distributor of goods. For instance, supplier server 120 may receive a purchase order from store 109 (e.g., via workstation 106), which identifies a request to purchase one or more items from supplier 121. The purchase order may include, for instance, a purchase order number, a product identifier (e.g., product ID, SKU number, etc.) for each product, a price for each product, a quantity for each product, and a purchase date. In some examples, supplier server 120 transmits an image of the purchase order to data extraction computing device 102, and data extraction computing device 102 may store the image of the purchase order within database 116. In some examples, supplier server 120 stores the image of the purchase order within database 116.

In some examples, any one of supplier 121 and store 109 may request shipper 131 to deliver the purchased products. For instance, and upon accepting a purchase order for products from store 109, supplier 121 may hire (e.g., contract) shipper 131 to deliver the products from a pickup location (e.g., manufacturing location) to a delivery location (e.g., store 109). The shipper may generate a BOL that identifies the products to be delivered. For instance, the BOL may identify the purchase order number, the product identifiers, the product prices, the product quantities, a purchase date, and an expected delivery date. Shipper computing device 130 may transmit an image of the BOL to data extraction computing device 102, and data extraction computing device 102 may store the image of the BOL within database 116. In some examples, shipper computing device 130 stores the image of the BOL within database 116.

The BOL may be formatted differently than the purchase order. For instance, the BOL may include any of the purchase order number, the product identifiers, the product prices, the product quantities, and the purchase date in different locations than the purchase order locates them in. Moreover, the BOL may include any of the purchase order number, the product identifiers, the product prices, the product quantities, and the purchase date in one formatting style (e.g., list form), while the purchase order may include the same information in another formatting style (e.g., paragraph form).

In some examples, data extraction computing device 102 locates and extracts information of interest from a document. Data extraction computing device 102 applies an optical character recognition (OCR) process to an image to determine characters and a location of each character in the scanned image. Further, data extraction computing device 102 embeds, in an image channel of the image (e.g., red channel), an ASCII value of a detected character as pixel values in pixels for the character. Data extraction computing device 102 repeats the process for each character, embedding the ASCII value of each character in the image channel to create a modified image. Data extraction computing device 102 inputs elements of the modified image into a machine learning model, such as a neural network, to extract information of interest from the scanned image. In some examples, data extraction computing device 102 trains the machine learning model based on modified images and, at least in some examples, corresponding ground truth data.

Generating Modified Images

Figure 4A:
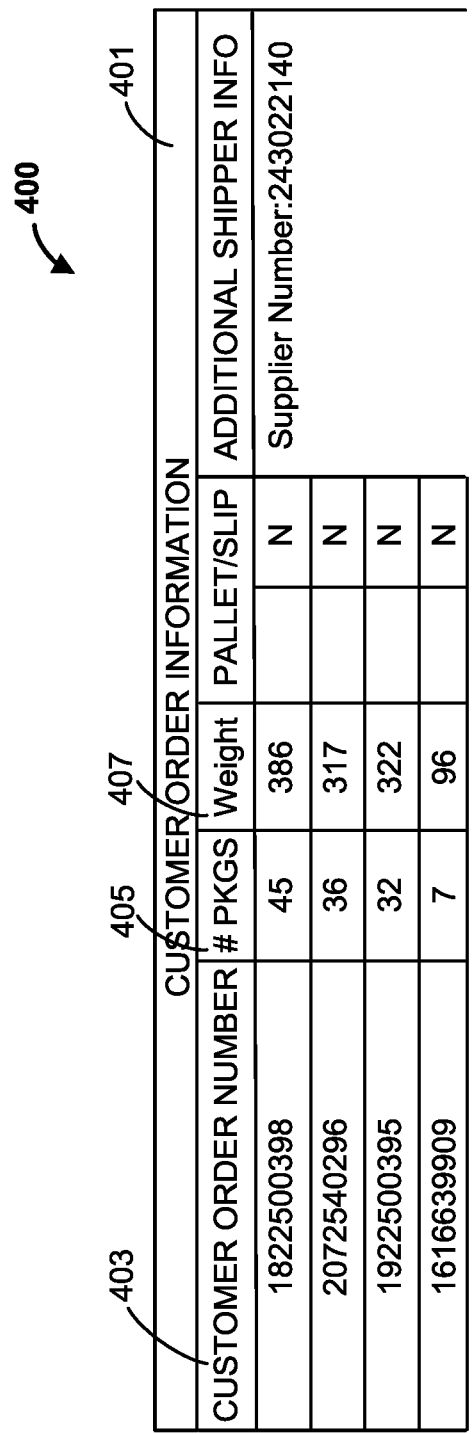
FIG. 4A illustrates an image of portions of a document in accordance with some embodiments.

In some examples, data extraction computing device 102 obtains an image of the purchase order from database 116. The image may include a plurality of image channels, such as a red, a green, and a blue color channel. For instance, FIG. 4A illustrates an image 400 of a document 401. The document 401 may be a BOL, for instance. In this example, the document 401 identifies order numbers 403, a number of packages 405 for each order number 403, and a weight 407 associated with each order number 403.

Figure 4B:
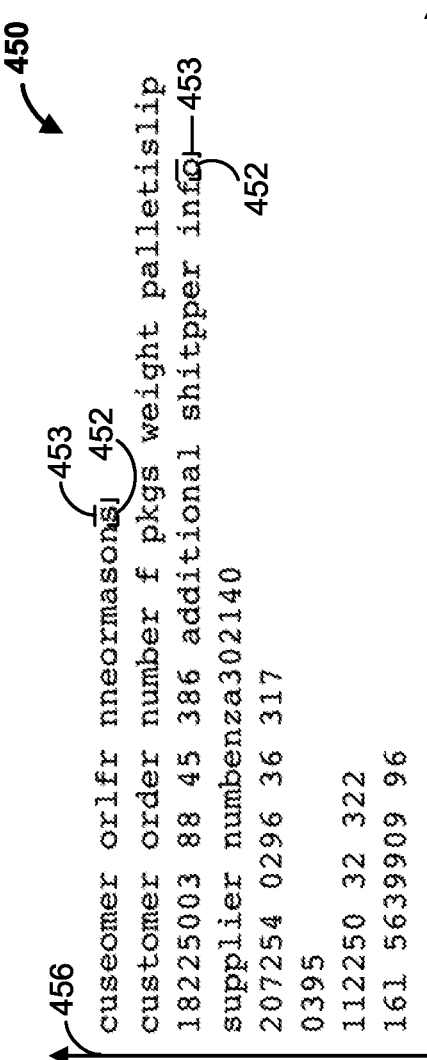
FIG. 4B illustrates the results of a character recognition process in accordance with some embodiments.

Referring back to FIG. 1, data extraction computing device 102 applies a character recognition process to the image to determine optical character recognition (OCR) data for the image. The output of the character recognition process may identify an area of the image (e.g., a bounding box), and a value, for each of one or more characters. For example, FIG. 4B illustrates OCR data 450 that be generated when data extraction computing device 102 applies a character recognition process to image 400 of FIG. 4A. OCR data 450 may identify one or more characters 452, and a corresponding bounding box 453 for each character 452. Each bounding box 453 may be defined by a range of horizontal pixel positions 454, and a range of vertical pixel positions 456. For instance, each bounding box may include a horizontal range defined by $X_{min}$, $X_{max}$, and a horizontal range defied by $Y_{min}$, $Y_{max}$.

Referring back to FIG. 1, data extraction computing device 102 may determine an area of the image based on the OCR data. For instance, data extraction computing device 102 may determine each of the bounding boxes 453 defined by the OCR data, and may determine the corresponding portions of the image for each of the bounding boxes 453.

Further, data extraction computing device 102 may adjust a value of each of a plurality of pixels corresponding to each determined area of the image based on a value of each corresponding character to generate a modified image. For instance, for each data extraction computing device 102 may determine a value, such as an ASCII value, of a character, and may adjust each of the pixel values of a channel, such as a red channel, of the corresponding area of the image to the value of the character, thereby generating the modified image.

Figure 5A:
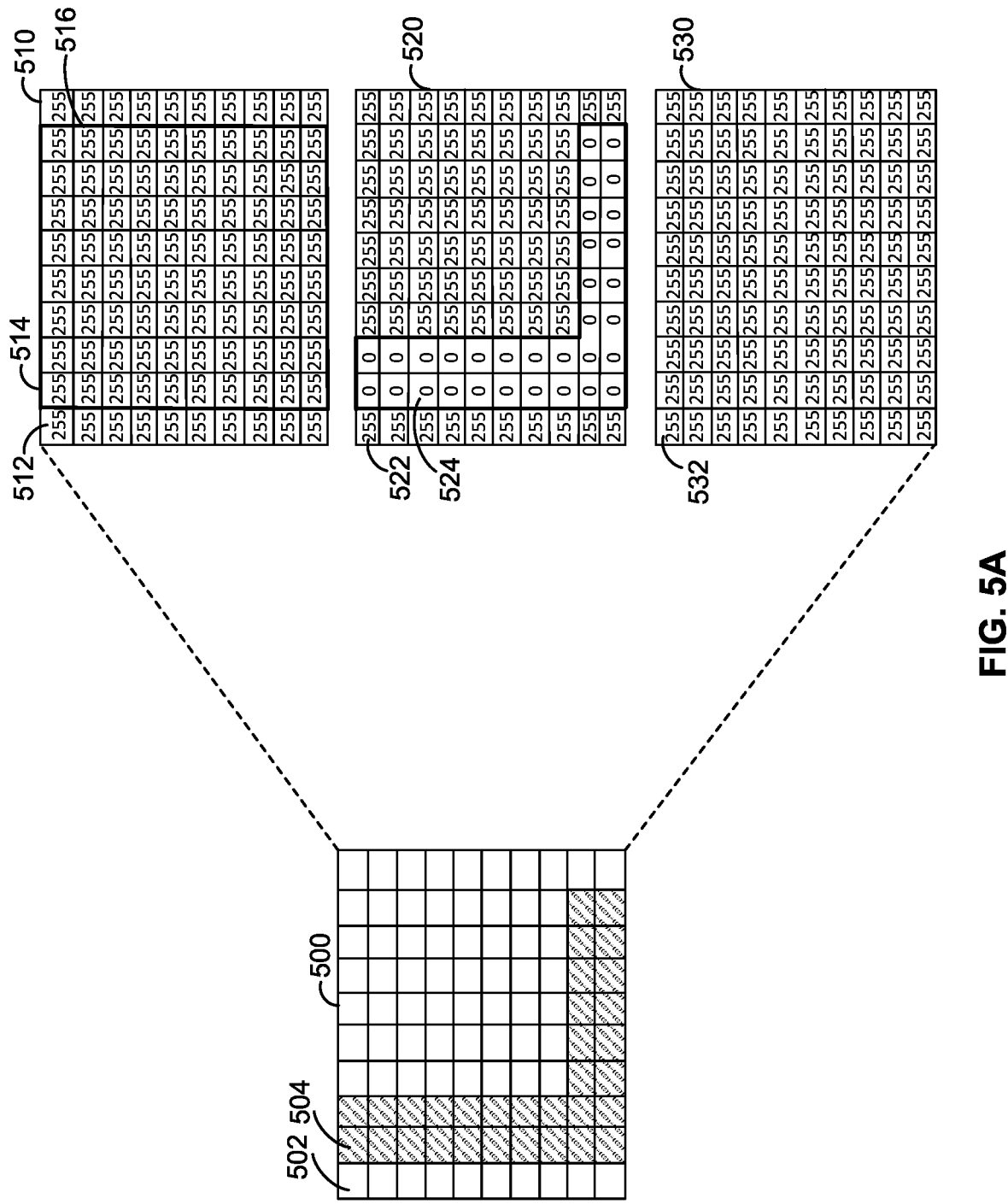
FIG. 5A illustrates a plurality of image channels of a modified image in accordance with some embodiments.

For example, FIG. 5A illustrates an original image 500 that includes a plurality of image channels. Original image 500 includes pixels 502 and pixels 504, where pixels 504 represent a character (i.e., "L"). Each of the plurality of pixels 502, 504 are defined by pixel values corresponding to each of a red channel 510, a green channel 520, and a blue channel 530. For example, pixel values for pixels 502 for each of the red channel 510, the green channel 520, and the blue channel 530 are 255 (e.g., on a scale of 0 to 255, an 8 bit number), such as pixel value 512 for the red channel 510, pixel value 522 for the green channel 520, and pixel value 532 for the blue channel 530. In addition, pixel values corresponding to each of the red channel 510 and the blue channel 530 for pixels 504 are also 255. Pixel values for the green channel 520 for pixels 504, however, are 0, such as pixel value 524. Thus, for example, when displayed, pixels 504 would appear in a different color than pixels 502.

FIG. 5B illustrates a modified image 550 of original image 500. As noted above, data extraction computing device 102 may adjust a value of each of a plurality of pixels corresponding to each determined area of the image based on a value of each corresponding character to generate a modified image. In FIG. 5B, determined area 516 may be a bounding box generated by application of a character recognition process to the original image, for instance. Pixel values corresponding to determined area 516 of the red channel 510 are modified to the value of the corresponding character, here, character "L." The ASCII value of the character "L" is 76. As such, the pixel values within the determined area 516 of the red channel 510 are modified to 76, such as pixel value 514.

Figures 4C, 4D:
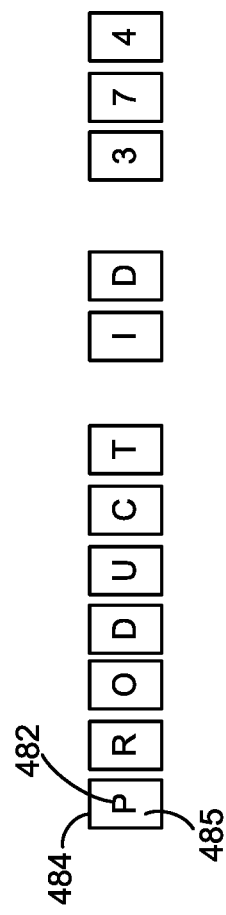
FIG. 4C illustrates a modified image in accordance with some embodiments.
FIG. 4D illustrates characters within bounding boxes in accordance with some embodiments.

FIG. 4C illustrates a modified image 470 in which pixel values for one of the image channels, such as the red channel, were modified based on corresponding character values. Specifically, pixel values corresponding to each bounding box associated with a character are modified based on each character's value. Thus, for instance, when displayed, at least portions of modified image 470 may appear in a different color than corresponding portions of image 400 due to the adjusting of the pixel values.

FIG. 4D illustrates characters 482 within corresponding bounding boxes 484. Pixel values of an image channel for pixels 485 within each bounding box 484 may be adjusted based on each character's 482 value (e.g., ASCII value). In some examples, rather than adjusting pixel values of an existing image channel, data extraction computing device 102 generates an additional channel (e.g., a fourth channel), and stores each character's value within the additional channel of the pixels corresponding to each character's bounding box.

Applying Machine Learning Processes to the Modified Images

Referring back to FIG. 1, data extraction computing device 102 may generate textual data based on the modified image. Textual data may include text data such as characters, a location of the text data (e.g., within the modified image), a type of the text data, and a value of any data point, for example. For instance, data extraction computing device 102 may apply a trained machine learning process (e.g., a trained neural network, a trained machine learning model, a trained algorithm) to elements of the modified image to generate output data characterizing bounding boxes and corresponding character values. The output data can also characterize the type of value associated with each bounding box.

As an example, the trained machine learning process may generate output data characterizing bounding boxes and corresponding values for characters of particular text, such as for "product number," as well as the product number itself (e.g., 0x12341234). Data extraction computing device 102 may generate the textual data based on the bounding boxes, the corresponding values, and the type of values. The type of value may identify whether the characters are a purchase order number (e.g., order number 403), a supplier number, or a product identification number, for example.

For instance, data extraction computing device 102 may generate a value (i.e., textual data) for the product number based on identifying the characters "product number," and determine the value of the product number based on the bounding boxes and corresponding values pertaining to characters that come after the identified characters for "product number" (e.g., the characters 0x12341234). Data extraction computing device 102 may store the textual data determined for the purchase order in database 116.

Textual Data Comparison

In some examples, data extraction computing device 102 may similarly generate textual data for another image of a document, such as the BOL. For instance, data extraction computing device 102 may apply the character recognition process to the image of the BOL to determine OCR data for the image. Further, data extraction computing device 102 may determine an area of the image that comprises a character based on the OCR data. Data extraction computing device 102 may then determine an area of the image that includes each of the characters based on the OCR data.

Further, data extraction computing device 102 may adjust a value of each of a plurality of pixels corresponding to each determined area of the image based on a value of each corresponding character to generate a modified image. In addition, data extraction computing device 102 may generate the textual data for the BOL based on the modified image. Data extraction computing device 102 may then store the textual data determined for the BOL in database 116.

In some instances, data extraction computing device 102 compares the textual data generated for one document, such as the textual data generated for the purchase order, to the textual data generated for another document, such as the textual data generated for the BOL. Data extraction computing device 102 may generate an alert, such as a visual, audio, or electronic message (e.g., SMS message, e-mail, message, etc.) if one or more of the same information fails to match. For instance, data extraction computing device 102 may compare a product number determined for the purchase order with a product number determined for the BOL. If the product numbers fail to match, data extraction computing device 102 may generate an alert. In some examples, data extraction computing device 102 generates status data characterizing whether similar information matches across two or more documents, and stores the status data within database 116.

In some examples, the textual data determined for a document is transmitted to store 109, supplier 121, or shipper 131. For instance, data extraction computing device 102 may transmit textual data characterizing a purchase order number determined from the image of the BOL to, for instance, supplier server 120 of supplier 121. Supplier 121 may then verify the purchase order number with that on the original purchase order. In other examples, data extraction computing device 102 may transmit textual data characterizing a purchase order number determined from the image of the purchase order to, for instance, shipper computing device 130 of shipper 131. Shipper 131 may then verify the purchase order number with that on the BOL, for example, at time of delivery of the purchased products.

Training the Machine Learning Processes

In some examples, data extraction computing device 102 may train the trained machine learning process based on modified images and corresponding ground truth labels. For instance, data extraction computing device 102 may generate a plurality of modified images based on images of various documents (e.g., purchase orders, BOLs, etc.). Further, an associate, such as a programmer, may provide input to data extraction computing device 102 to generate ground truth labels for one or more of the characters identified by corresponding OCR data. For instance, when training to identify purchase order numbers, the ground truth labels may be generated such as to positively characterize characters corresponding to the purchase order number (e.g., positively labelled), and may further negatively characterize characters corresponding to other information (e.g., negatively labelled). data extraction computing device 102 may generate features based on the modified images, and may train the machine learning process based on the generated features and corresponding ground truth labels. Based on the training, the machine learning process may adjust one or more parameters (e.g., hyperparameters, weights, etc.) as the machine learning process "learns" to identify particular information, such as purchase order numbers, in a variety of document images.

In some examples, the machine learning process is trained until at least one metric threshold is satisfied. For example, the weights of the model may be adjusted until the at least one metric threshold is satisfied (e.g., until the at least one metric is below a threshold). In some instances, the machine learning process (e.g., neural network) may be trained until a loss, such as a mean squared error (MSE) loss, is minimized over the training data set.

Once trained, data extraction computing device 102 may store the machine learning model parameters (e.g., hyperparameters, configuration settings, weights, etc.) associated with the machine learning process within database 116. As such, during inference, data extraction computing device 102 may obtain the parameters from database 116, configure the machine learning model with or based on the obtained parameters, and execute the machine learning model accordingly.

Figure 2:
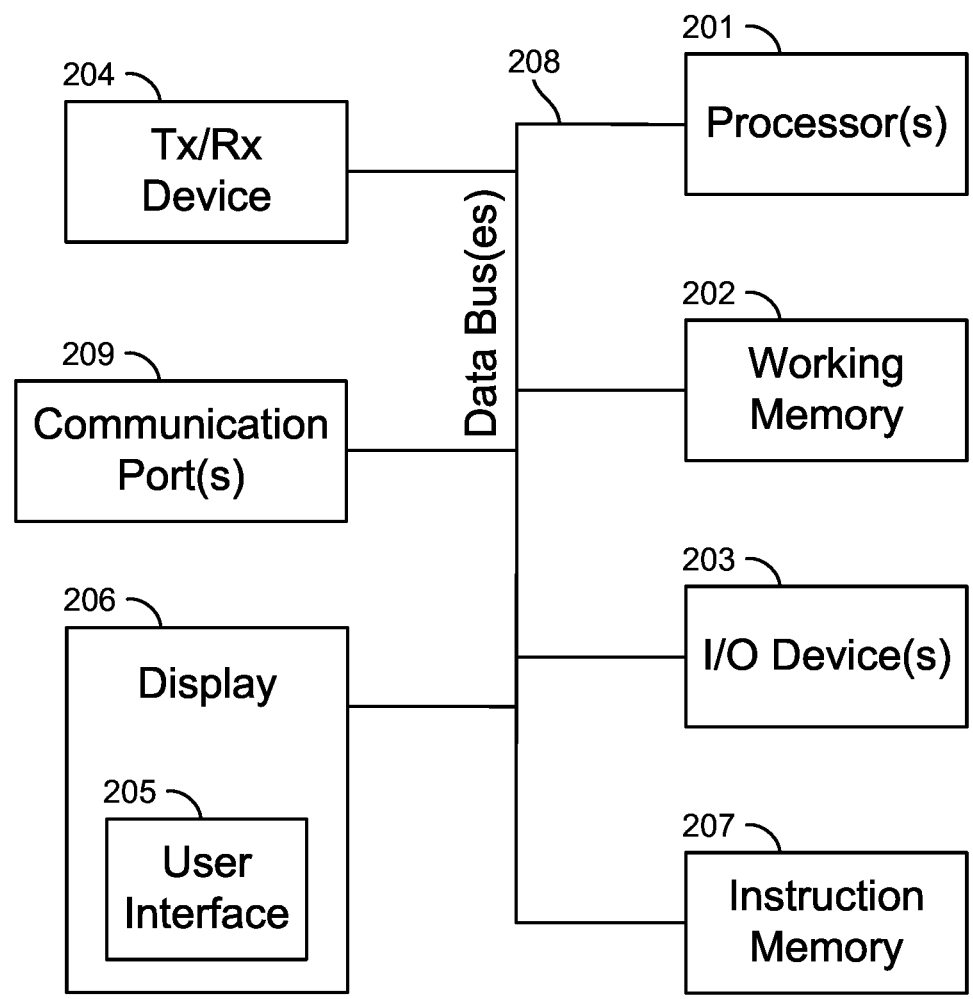
FIG. 2 is a block diagram of an exemplary data extraction computing device in accordance with some embodiments.

FIG. 2 illustrates an exemplary data extraction computing device 102 of FIG. 1. Data extraction computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can store instructions that, when executed by one or more processors 201, cause the one or more processors 201 to perform any of the operations described herein, including training and executing any of the machine learning processes described herein. Instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of data extraction computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as training data.

Display 206 can display user interface 205. User interfaces 205 can enable user interaction with data extraction computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 data extraction computing device 102 will be operating in. Processor(s) 201 is operable to receive data from, or send data to, a network, such as communication network 118 of FIG. 1, via transceiver 204.

Figure 3A:
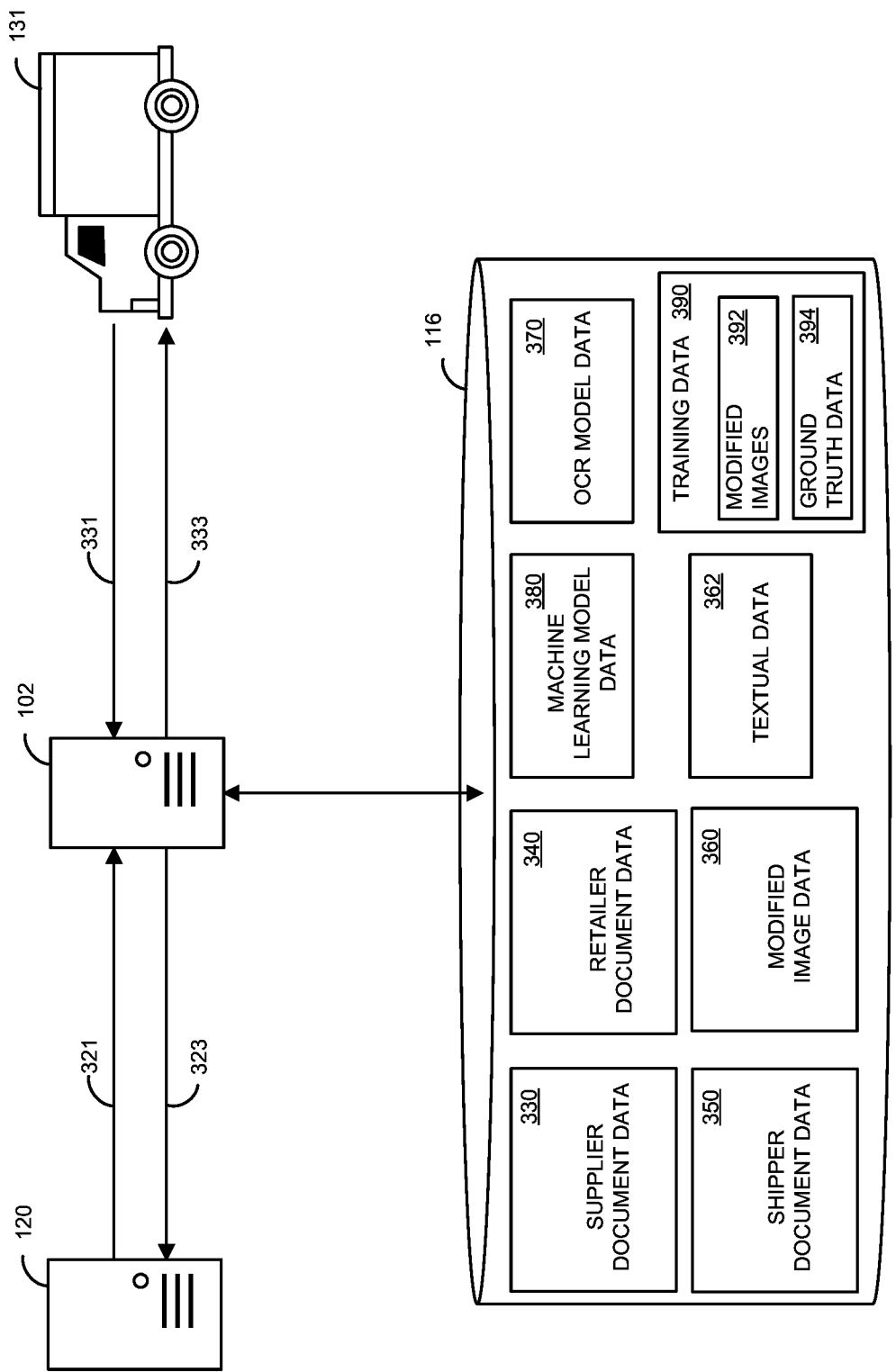
FIGS. 3A and 3B are block diagrams illustrating examples of various portions of the data extraction system of FIG. 1 in accordance with some embodiments.

FIG. 3A is a block diagram illustrating examples of various portions of the data extraction system of FIG. 1. In this example, database 116 stores supplier document data 330, retailer document data 340, and shipper document data 350, each of which may characterize one or more images of documents. Further, supplier document data 330 may include an image of a purchase order, retailer document data 340 may include an image of a purchase order request, and shipper document data 350 may include an image of a BOL.

For instance, data extraction computing device 102 may receive a purchase order message 321 from supplier server 120. The purchase order message 321 may include an image of a purchase order, for example. Data extraction computing device I 02 may parse the purchase order message 321 to extract the image of the purchase order, and may store the extracted image within supplier document data 330 of database 116. Similarly, data extraction computing device 102 may receive a BOL message 331 from computing device 130 of shipper 131. The BOL message 331 may include an image of a BOL, for example. Data extraction computing device I 02 may parse the BOL message 331 to extract the image of the BOL, and may store the extracted image within shipper document data 350 of database 116.

Database 116 also stores OCR model data 370, which characterizes one or more character recognition models, such as an OCR algorithm. Database 116 further stores machine learning model data 380, which characterizes one or more machine learning models and corresponding parameters (hyperparameters, configuration settings, weights, etc.), such as a trained neural network.

As described herein, data extraction computing device 102 may apply a character recognition process characterized by OCR model data 370 to any image (i.e., the original image) characterized by any of supplier document data 330, retailer document data 340, and shipper document data 350, to generate OCR data for the image. Data extraction computing device 102 may then determine an area of the image that includes a character based on the OCR data. Further, data extraction computing device 102 may generate a modified image by adjusting a pixel value of each of a plurality of pixels corresponding to the determined area of the image, where the pixel value is adjusted to a value of the corresponding character. Data extraction computing device 102 may store the modified image within database 116 as modified image data 360.

As also described herein, data extraction computing device 102 may apply a trained machine learning process characterized by machine learning model data 380 (e.g., a trained neural network, a trained machine learning model, a trained algorithm) to the modified image to generate textual data. For instance, data extraction computing device 102 may input elements of the modified image to a trained neural network, and may obtain as output from the trained neural network the textual data. The textual data may identify and characterize characters within the original image. Data extraction computing device 102 may store the textual data within database 116 as textual data 362.

In some examples, data extraction computing device 102 trains one or more machine learning models characterized by machine learning model data 380 based on, for example, training data 390. For instance, training data 390 may include a plurality of modified images 392, and corresponding ground truth data 394. The plurality of modified images 392 may characterize images with pixel values adjusted based on a value of a corresponding character, as described herein. Further, the ground truth data 394 may characterize a label for one or more characters of a corresponding modified image 392 (e.g., positive or negative label). As described herein, data extraction computing device 102 may generate features based on the modified images 392 and the ground truth data 394, and may train a machine learning model, such as a neural network, based on the generated features. Once the machine learning model is sufficiently trained, data extraction computing device 102 may store one or more parameters corresponding to the trained machine learning process within machine learning model data 380 of database 116.

In some examples, data extraction computing device 102 may transmit at least portions of the textual data 362. For instance, data extraction computing device 102 may generate a purchase order identification message 323 that includes at least portions of textual data 362 generated from an image of a purchase order (e.g., received within purchase order message 321). Similarly, data extraction computing device 102 may generate a BOL identification message 333 that includes at least portions of textual data 362 generated from an image of a BOL (e.g., received within BOL message 331)

Figure 3B:
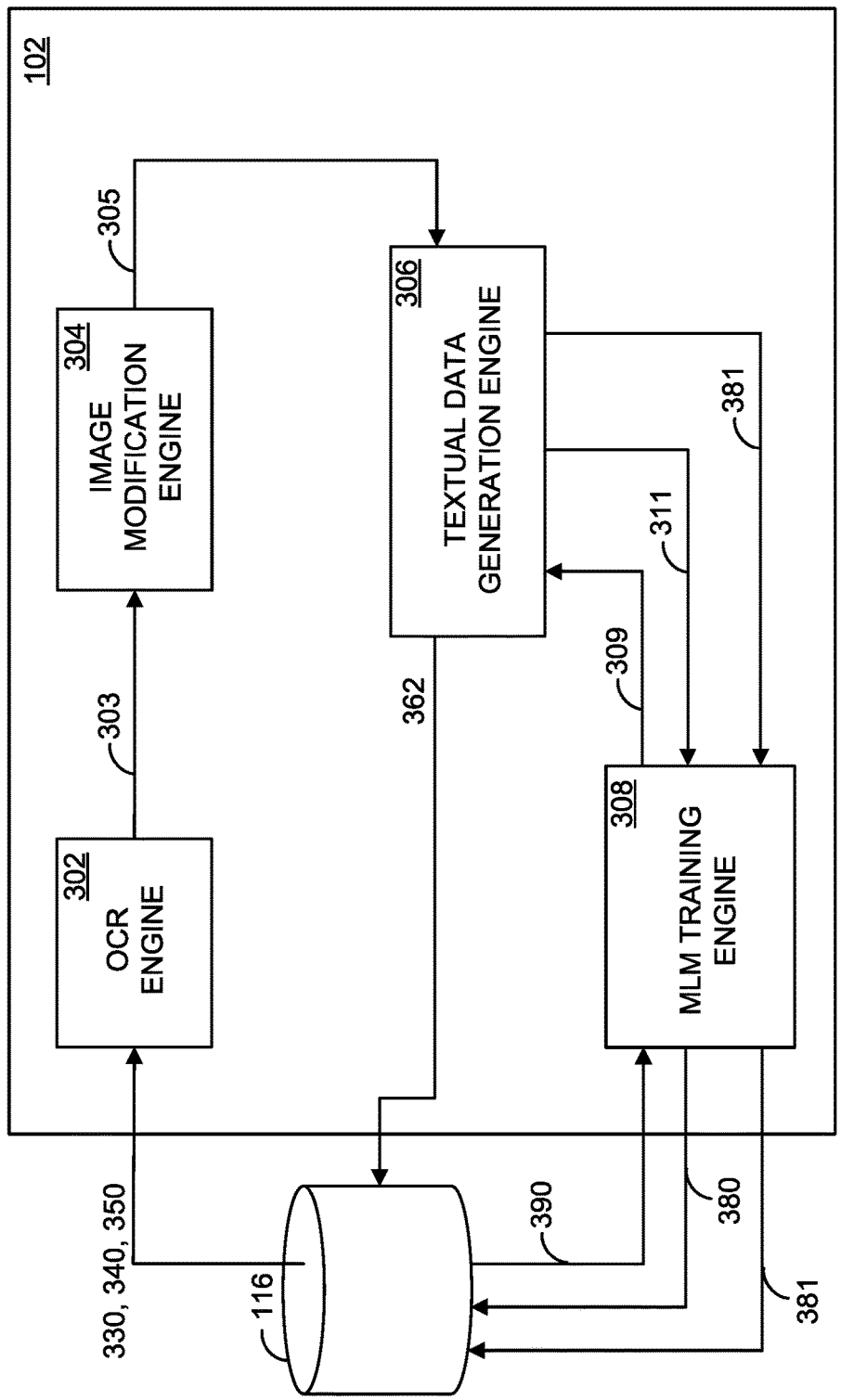

FIG. 3B is a block diagram illustrating further details of an exemplary data extraction computing device 102. In this example, data extraction computing device 102 includes OCR engine 302, image modification engine 304, textual data generation engine 306, and machine learning model (MLM) training engine 308. In some examples, one or more of OCR engine 302, image modification engine 304, textual data generation engine 306, and MLM training engine 308 may be implemented in hardware. In some examples, one or more of OCR engine 302, image modification engine 304, textual data generation engine 306, and MLM training engine 308 may be implemented as an executable program maintained in a tangible, non-transitory memory, such as instruction memory 207 of FIG. 2, which may be executed by one or processors, such as processor 201 of FIG. 2.

OCR engine 302 may obtain, from database 116, one or more of supplier document data 330, retailer document data 340, and shipper document data 350, referred to in the remaining description of FIG. 3B as the obtained image data. As described herein, each of supplier document data 330, retailer document data 340, and shipper document data 350 may include one or more images of documents. OCR engine 302 may apply a character recognition process to the obtained image data to generate optical character recognition (OCR) data 303. For instance, OCR engine 302 may obtain OCR model data 370 from database 116, and may apply a corresponding character recognition model to the obtained image to generate OCR data 303 characterizing characters and corresponding bounding boxes.

Image modification engine 304 may receive OCR data 303 from OCR engine 302, and may adjust one or more pixel values of the obtained image based on the value of each corresponding character, as described herein to generate a modified image 305. For instance, image modification engine 304 may determine corresponding portions of the obtained image for each of the bounding boxes (e.g., bounding boxes 453) of the OCR data 303. Further, image modification engine 304 may adjust a value of each of a plurality of pixels corresponding to each determined area of the obtained image based on a value of each corresponding character to generate the modified image 305.

Textual data generation engine 306 may receive, from image modification engine 304, the modified image 305. Textual data generation engine 306 may apply a trained machine learning process to the modified image 305 and, based on the application of the trained machine learning process to the modified image 305, generate textual data 362 characterizing text within the obtained image. For instance, textual data generation engine 306 may obtain machine learning model data 380 from database 116, and may configure a machine learning model (e.g., a neural network) in accordance with parameters obtained from machine learning model data 380. Further, image modification engine 304 may generate features based on the modified image 305, and may input the features to the configured machine learning model. The configured machine learning model may output elements of output data characterizing, for example, bounding boxes corresponding to characters within the modified image. Image modification engine 304 may generate textual data 362 characterizing the characters corresponding to the bounding boxes, and may store the textual data 362 within database 116.

In some examples, MLM training engine 308 may train a machine learning model executed by textual data generation engine 306. For instance, MLM training engine 308 may obtain, from database 116, training data 390, which may include modified images 192 and corresponding ground truth data 394. MLM training engine 308 may generate features 309 based on the modified images 192 and the corresponding ground truth data 394, and provide the generated features 309 to textual data generation engine 306 for training the machine learning model. Textual data generation engine 306 may input the features 309 to the untrained machine learning model, and which may generate output data 311 characterizing bounding boxes and corresponding values.

Further, MLM training engine 308 may receive the generated features 311 from textual data generation engine 306, and may determine whether the machine learning model is trained based on the features 311. MLM training engine 308 may cause the machine learning model to be trained until at least one metric threshold is satisfied. For instance, MLM training engine 308 may compute a loss, such as an MSE loss, based on the features 311 and the ground truth data 390. MLM training engine 308 may cause the machine learning model to be trained until the loss is minimized over the training data set (e.g., training data 390). For example, MLM training engine 308 may train the machine learning model, and thereby have the weights of the model adjust, until the loss satisfies a threshold (e.g., the loss is below a threshold).

Once trained, MLM training engine 308 may obtain the machine learning model parameters 381 (e.g., hyperparameters, configuration settings, weights, etc.) associated with the machine learning model from textual data generation engine 306, and may store the parameters 381 within machine learning model data 380 of database 116. As such, during inference, textual data generation engine 306 may obtain the parameters from database 116, configure the machine learning model with or based on the obtained parameters, and execute the machine learning model accordingly.

FIG. 6 is a flowchart of an example method 600 that can be carried out by the data extraction computing device 102 of FIG. 1. For instance, one or more processors 201 may receive executable instructions from instruction memory 207, and may execute the instructions to carry any the steps of method 600. Beginning at step 602, data extraction computing device 102 receives an image comprising one or more image channels. For instance, the image may include red, green, and blue color channels. In other examples, the image may include luminance and chrominance channels. At step 604, data extraction computing device 102 applies a character recognition process to the image to generate character recognition data. As described herein, the character recognition data may characterize bounding boxes corresponding to detected characters within the image.

Proceeding to step 606, data extraction computing device 102 determines an area of the image that comprises a character based on the character recognition data. For instance, and based on the bounding boxes identified by the character recognition data, data extraction computing device 102 determines an area of the image that corresponds to each bounding box. Each determined area of the image may be a range of pixels in both a horizontal, and vertical, direction (e.g., bounding box 484).

Further, and at step 608, data extraction computing device 102 adjusts a value of each of a plurality of pixels corresponding to the determined area of the image based on a value of the character to generate a modified image. For instance, data extraction computing device 102 may determine an ASCII value of a character identified by the OCR data, and set the pixel values of pixels in the determined area for a red channel of the image to the determined ASCII value. In some examples, rather than adjusting a current image channel of the image, data extraction computing device 102 generates a new channel (e.g., a fourth channel to the red, green, and blue channels), and sets the corresponding pixel values to the ASCII value.

At step 610, data extraction computing device 102 extracts textual data from the image based on the modified image. For instance, step 610 may be carried out by steps 612, 614, and 616. At step 612, data extraction computing device 102 generates features based on the modified image. At step 614, data extraction computing device 102 inputs the generated features to a trained machine learning process to generate output data. The output data may characterize bounding boxes, and values (e.g., ASCII values) associated with each of the bounding boxes. Further, and at step 616, data extraction computing device 102 determines textual data from the image based on the output data. For instance, data extraction computing device 102 may determine a "purchase order number" from the image based on the output data.

In some examples, data extraction computing device 102 may store the textual data within a data repository, such as within database 116. In some examples, data extraction computing device 102 may transmit at least portions of the textual data (e.g., to shipper 131 or supplier 121). The method then ends.

Figure 7:
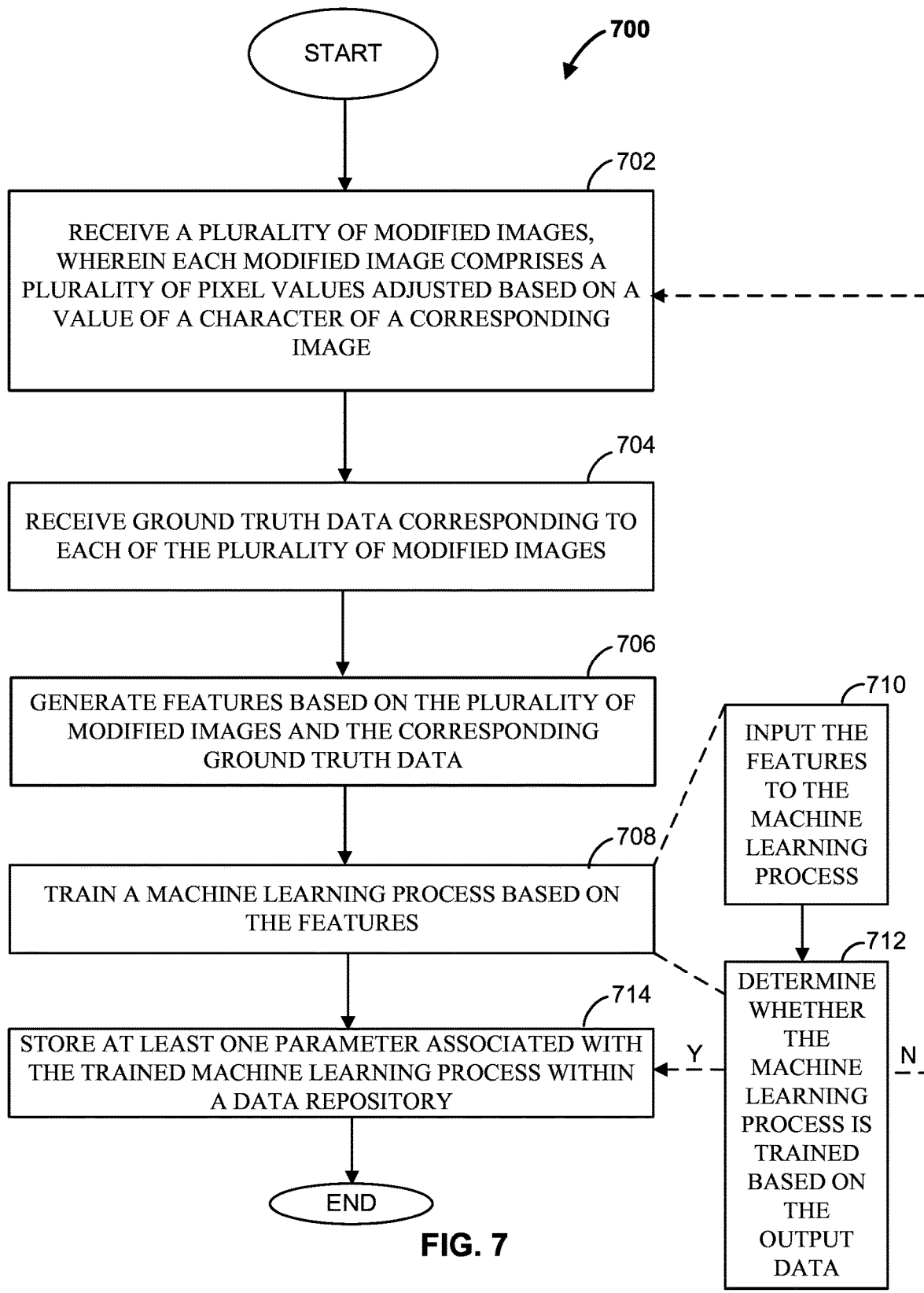
FIG. 7 is a flowchart of another example method that can be carried out by the data extraction system 100 of FIG. 1 in accordance with some embodiments.

FIG. 7 is a flowchart of an example method 700 that can be carried out by the data extraction computing device 102 of FIG. 1. For instance, one or more processors 201 may receive executable instructions from instruction memory 207, and may execute the instructions to carry any the steps of method 600. Beginning at step 702, data extraction computing device 102 receives a plurality of modified images. Each modified image may comprise a plurality of pixel values that have been adjusted based on a value of a character of a corresponding image (e.g., of an original image). For instance, data extraction computing device 102 may obtain modified images 392 from database 116, which characterizes a plurality of modified images as described herein.

At step 704, data extraction computing device 102 receives ground truth data corresponding to each of the plurality of modified images. For instance, data extraction computing device 102 may obtain ground truth data 394 from data base 116. The ground truth data 394 characterizes a label for one or more characters of a corresponding modified image 392.

Further, and at step 706, data extraction computing device 102 generates features based on the plurality of modified images and the corresponding ground truth data. For instance, data extraction computing device 102 may generate a first set of vectors based on each modified image, and may generate a second set of vectors based on each modified image's corresponding ground truth data. At step 708, data extraction computing device 102 trains a machine learning process based on the generated features.

In some examples, step 708 may be carried out by steps 710 and 712. For instance, at step 710, data extraction computing device 102 inputs the generated features to the machine learning process. At step 712, and based on output data generated by the machine learning process, data extraction computing device 102 determines whether the machine learning process is trained. For instance, data extraction computing device 102 may compute a metric, such as a loss, based on the output data, and may determine whether the metric satisfies a predetermined metric threshold. If the metric does not satisfy the metric threshold, the method proceeds back to step 702 to continue training the machine learning process. Otherwise, if the metric does satisfy the metric threshold, the method proceeds to step 714.

At step 714, data extraction computing device 102 stores at least one parameter associated with the now trained machine learning process within a data repository, such as within machine learning model data 380 of database 116. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Further, although some of the exemplary embodiments described herein are directed to detecting textual data, the embodiments can be adapted to detect different data formats within images. For example, a computing device, such as data extraction computing device 102, can receive an image comprising at least one image channel, and determine optical character recognition data for the image. Further, the computing device can determine an area of the image that comprises a value of a particular data format based on the optical character recognition data. The computing device can adjust a value of each of a plurality of pixels corresponding to the area of the image based on the value of the particular data format to generate a modified image.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a processor; and
   a non-transitory memory storing instructions that, when executed, cause the processor to:
      receive an image comprising at least one image channel;
      determine optical character recognition data for the image;
      determine an area of the image that comprises a character based on the optical character recognition data;
      set a value of each of a plurality of pixels of the at least one image channel corresponding to the area of the image to a value of the character to generate a modified image; and
      apply a trained machine learning process to the modified image to generate textual data based on the modified image, wherein the trained machine learning process is trained using training data comprising features of one or more modified images and at least one or more ground truth labels, wherein the one or more ground truth labels include positively and negatively identifying each of a plurality of features of a character of interest.

2. The system of claim 1, wherein the instructions cause the processor set the value of each of the plurality of pixels in an image channel of the at least one image channel.

3. The system of claim 2, wherein the image channel is at least one of a red color channel, a blue color channel, and a green color channel.

4. The system of claim 2, wherein the image channel is at least one of a luminance channel and a chrominance channel.

5. The system of claim 1, wherein the instructions cause the processor to:
generate an additional image channel for the image; and
set the value of each of the plurality of pixels in the additional image channel.

6. The system of claim 1, wherein setting the value of each of the plurality of pixels comprises:
determining the value of the character as an ASCII value; and
setting the value of each of the plurality of pixels based on the ASCII value.

7. The system of claim 1, wherein determining the area of the image that comprises the character comprises determining a bounding box identifying the plurality of pixels of the image.

8. The system of claim 1, wherein applying the trained machine learning process comprises establishing a trained neural network.

9. The system of claim 1, wherein applying the trained machine learning process to the modified image comprises:
generating features based on the modified image;
inputting the features to a trained machine learning model to generate output data; and
generating the textual data based on the output data.

10. The system of claim 9, wherein the output data characterizes a bounding box and a corresponding character, and wherein the instructions cause the processor to generate the textual data based on the corresponding character.

11. The system of claim 10, wherein the textual data characterizes a purchase order number.

12. The system of claim 1, wherein the instructions cause the processor to store the textual data in a data repository.

13. The system of claim 1, wherein the instructions cause the processor to transmit at least portions of the textual data.

14. A method comprising:
receiving an image comprising at least one image channel;
determining optical character recognition data for the image;
determining an area of the image that comprises a character based on the optical character recognition data;
setting a value of each of a plurality of pixels of the at least one image channel to the area of the image to a value of the character to generate a modified image; and
applying a trained machine learning process to the modified image to generate textual data based on the modified image, wherein the trained machine learning process is trained using training data comprising features of one or more modified images and at least one or more ground truth labels, wherein the one or more ground truth labels include positively and negatively identifying each of a plurality of features of a character of interest.

15. The method of claim 14 comprising setting the value of each of the plurality of pixels in an image channel of the at least one image channel.

16. The method of claim 14 comprising:
generating an additional image channel for the image; and
setting the value of each of the plurality of pixels in the additional image channel.

17. The method of claim 14 wherein setting the value of each of the plurality of pixels comprises:
determining the value of the character as an ASCII value; and
setting the value of each of the plurality of pixels based on the ASCII value.

18. A non-transitory computer readable medium having instructions stored thereon, wherein the instructions, when executed by at least one processor, cause a device to perform operations comprising:
receiving an image comprising at least one image channel;
determining optical character recognition data for the image;
determining an area of the image that comprises a character based on the optical character recognition data;
setting a value of each of a plurality of pixels of the at least one image channel corresponding to the area of the image to a value of the character to generate a modified image; and
applying a trained machine learning process to the modified image to generate textual data based on the modified image, wherein the trained machine learning process is trained using training data comprising features of one or more modified images and at least one or more ground truth labels, wherein the one or more ground truth labels include positively and negatively identifying each of a plurality of features of a character of interest.

19. The non-transitory computer readable medium of claim 18, wherein the operations comprise setting the value of each of the plurality of pixels in an image channel of the at least one image channel.

\* \* \* \* \*

UNITED STATES PATENT AND TRADEMARK OFFICE
CERTIFICATE OF CORRECTION

| | | |
|---|---|---|
| PATENT NO. | : 12,354,391 B2 | Page 1 of 1 |
| APPLICATION NO. | : 17/826837 | |
| DATED | : July 8, 2025 | |
| INVENTOR(S) | : Ramanujam Ramaswamy Srinivasa et al. | |

It is certified that error appears in the above-identified patent and that said Letters Patent is hereby corrected as shown below:

On the Title Page

Item (57) Abstract
Please delete:
"This application relates to systems and methods for identifying anomalous interactions. Interaction data representative of an interaction is received and the interaction is classified as one of an anomalous interaction or a benign interaction using an anomaly detection model. The anomaly detection model is configured to identify a similarity between the interaction data and known benign interactions. An indication of authorization is generated based on the classification of the interaction. The indication of authorization authorizes the interaction when the anomaly detection model classifies the interaction as benign and the indication of authorization denies the interaction when the anomaly detection model classifies the interaction as anomalous."

Please replace with the following:
--This application is related to automatic processes for identifying and extracting information from images of documents of varying layouts. For example, a computing device may receive an image of a document, where the image includes a plurality of color channels. The computing device applies a character recognition process to the image to generate optical character recognition data. Further, the computing device determines an area of the image that includes one or more characters based on the optical character recognition data. The computing device adjusts a value of each of a plurality of pixels corresponding to the area of the image determined for each character based on a value of each corresponding character to generate a modified image. The computing device then applies a trained machine learning process to the modified image to generate output data. The output data characterizes characters, such as words and number values, within the original image.--

Signed and Sealed this
Nineteenth Day of August, 2025

Coke Morgan Stewart
*Acting Director of the United States Patent and Trademark Office*